United States Patent
Banerjee et al.

(10) Patent No.: US 8,431,015 B2
(45) Date of Patent: Apr. 30, 2013

(54) WELLHEAD HYDROCARBON UPGRADING USING MICROWAVES

(75) Inventors: Dwijen K. Banerjee, Owasso, OK (US); Kenneth W. Smith, Tonkawa, OK (US)

(73) Assignee: ConocoPhillips Company, Houston, TX (US)

( * ) Notice: Subject to any disclaimer, the term of this patent is extended or adjusted under 35 U.S.C. 154(b) by 456 days.

(21) Appl. No.: 12/783,383

(22) Filed: May 19, 2010

(65) Prior Publication Data

US 2010/0294490 A1    Nov. 25, 2010

Related U.S. Application Data

(60) Provisional application No. 61/180,045, filed on May 20, 2009.

(51) Int. Cl.
*E21B 43/24* (2006.01)
(52) U.S. Cl.
USPC .. 208/106; 208/132; 204/157.15; 204/157.63
(58) Field of Classification Search ............... 208/106, 208/132; 204/157.15, 157.63
See application file for complete search history.

(56) References Cited

U.S. PATENT DOCUMENTS

| | | |
|---|---|---|
| 4,140,180 A | 2/1979 | Bridges et al. |
| 4,144,935 A | 3/1979 | Bridges et al. |
| 4,193,448 A | 3/1980 | Jeambey |
| RE30,738 E | 9/1981 | Bridges et al. |
| 4,485,868 A | 12/1984 | Sresty et al. |
| 4,620,583 A | 11/1986 | Koide et al. |
| 4,620,593 A | 11/1986 | Haagensen |
| 4,638,863 A | 1/1987 | Wilson |
| 4,819,723 A | 4/1989 | Whitfill et al. |
| 4,912,971 A | 4/1990 | Jeambey |
| 5,055,180 A | 10/1991 | Klaila |
| 5,076,727 A | 12/1991 | Johnson et al. |
| 5,082,054 A | 1/1992 | Kiamanesh |
| 5,299,887 A | 4/1994 | Ensley |
| 5,321,222 A | 6/1994 | Bible et al. |
| 5,521,360 A | 5/1996 | Johnson et al. |
| 5,899,274 A | 5/1999 | Frauenfeld et al. |
| 5,914,014 A | 6/1999 | Kartchner |
| 6,012,520 A | 1/2000 | Yu et al. |
| 6,077,400 A | 6/2000 | Kartchner |

(Continued)

FOREIGN PATENT DOCUMENTS

| | | |
|---|---|---|
| DE | 3813014 | 11/1989 |
| EP | 307003 A2 | 3/1989 |

(Continued)

OTHER PUBLICATIONS

Gary, J.H. et al. (2007) Petroleum Refining Technology and Economics, 5th ed, Taylor & Francis, 465 pgs.*

(Continued)

*Primary Examiner* — Brian McCaig
(74) *Attorney, Agent, or Firm* — ConocoPhillips Company

(57) ABSTRACT

Methods and apparatus relate to processes and systems that introduce microwaves into mixtures containing hydrocarbons. The microwaves cause heating of the hydrocarbons in order to upgrade the hydrocarbons. Such upgrading occurs after recovering the hydrocarbons from within a formation and results in lowering viscosity of the hydrocarbons to enable transportation of the hydrocarbons to offsite locations, such as a refinery.

11 Claims, 2 Drawing Sheets

U.S. PATENT DOCUMENTS

| | | | |
|---|---|---|---|
| 6,086,830 | A | 7/2000 | Kartchner |
| 6,284,105 | B1 | 9/2001 | Eliasson et al. |
| 6,544,411 | B2 | 4/2003 | Varadaraj |
| 6,814,141 | B2 | 11/2004 | Huh et al. |
| 6,955,753 | B1 * | 10/2005 | Gomez .................... 208/252 |
| 7,073,577 | B2 | 7/2006 | Yu |
| 7,091,460 | B2 | 8/2006 | Kinzer |
| 7,109,457 | B2 | 9/2006 | Kinzer |
| 7,115,847 | B2 | 10/2006 | Kinzer |
| 7,312,428 | B2 | 12/2007 | Kinzer |
| 7,331,385 | B2 | 2/2008 | Symington et al. |
| 2005/0199386 | A1 | 9/2005 | Kinzer |
| 2006/0076347 | A1 | 4/2006 | Kinzer |
| 2006/0102625 | A1 | 5/2006 | Kinzer |
| 2006/0107972 | A1 | 5/2006 | Al-Sugair et al. |
| 2006/0180304 | A1 | 8/2006 | Kasevich |
| 2007/0000662 | A1 | 1/2007 | Symington et al. |
| 2007/0108202 | A1 | 5/2007 | Kinzer |
| 2007/0131591 | A1 | 6/2007 | Pringle |
| 2007/0215613 | A1 | 9/2007 | Kinzer |
| 2007/0246994 | A1 | 10/2007 | Kaminsky et al. |
| 2007/0289736 | A1 | 12/2007 | Kearl |
| 2008/0073079 | A1 | 3/2008 | Tranquilla et al. |
| 2008/0087428 | A1 | 4/2008 | Symington et al. |
| 2008/0173443 | A1 | 7/2008 | Symington et al. |
| 2008/0190813 | A1 | 8/2008 | Dana et al. |
| 2008/0190815 | A1 | 8/2008 | Dana et al. |
| 2008/0190816 | A1 | 8/2008 | Dana et al. |
| 2008/0190818 | A1 | 8/2008 | Dana et al. |
| 2008/0207970 | A1 | 8/2008 | Meurer et al. |
| 2008/0221226 | A1 | 9/2008 | Coutinho et al. |
| 2008/0230219 | A1 | 9/2008 | Kaminsky |
| 2010/0078163 | A1 | 4/2010 | Banerjee et al. |

FOREIGN PATENT DOCUMENTS

| | | |
|---|---|---|
| GB | 0896407 | 5/1962 |
| JP | 5112004104 | 10/1976 |
| WO | 9408739 | 4/1994 |
| WO | 9610065 | 4/1996 |
| WO | 2005010320 | 5/2005 |
| WO | 2005091883 | 10/2005 |
| WO | 2005093210 | 10/2005 |
| WO | 2007/081493 | 7/2007 |
| WO | 2007084763 | 7/2007 |
| WO | 2007099315 | 9/2007 |
| WO | 2007126676 | 11/2007 |
| WO | 2008030337 | 3/2008 |
| WO | 2008048448 | 4/2008 |
| WO | 2008091405 | 7/2008 |
| WO | 2008098177 | 8/2008 |
| WO | 2008115356 | 9/2008 |
| WO | WO 2009/156961 A1 * | 12/2009 |

OTHER PUBLICATIONS

Tang, J. et al. (2008). Macromolecules, 41, 493-496.*

* cited by examiner

WELLHEAD HYDROCARBON UPGRADING USING MICROWAVES

CROSS-REFERENCE TO RELATED APPLICATIONS

None

FIELD OF THE INVENTION

Embodiments of the invention relate to methods and systems for upgrading hydrocarbons using microwaves.

BACKGROUND OF THE INVENTION

Viscous properties of heavy oil and bitumen create problems with handling of such produced products prior to upgrading at a refinery offsite from a well where produced. Expensive infrastructure and environmental concerns prevent bringing conventional refining equipment, such as hydrocrackers or cokers, to a wellhead for onsite upgrading. Viscosity of the products makes pumping the products through pipelines from the well difficult and expensive.

One approach utilized to facilitate in moving the product through the pipeline relies on blending the product with liquid hydrocarbon condensate. However, the condensate occupies volume within the pipeline and thereby limits amount of the product being transported. Further, expense of the condensate and any return pipelines for the condensate contribute to cost of moving the product.

Various other techniques attempt to lower viscosity of the product by using microwaves to target molecules present within heavy oil and bitumen reservoirs. The microwaves only interact with the molecules that have a dipole moment through a coupling phenomenon. The molecules exposure to an alternating electric field results in the molecules beginning to rotate or reorient in order to follow the field and thereby couple with, or absorb, the microwaves having an appropriate frequency. Sustained reorienting of neighboring molecules, as well as different orientations of dipole moments due to changing of the field, generates heat. These prior techniques employing the microwaves offer limited usefulness due to inefficiency, especially for purposes of upgrading. Further, the heat often results in only a temporary reduction in viscosity that is beneficial for aspects such as initial recovery. Such temperature dependent viscosity reduction fails to enable transport in pipelines where the heat is lost.

Therefore, a need exists for improved processes and systems that use microwaves to produce an upgraded hydrocarbon.

SUMMARY OF THE INVENTION

In one embodiment, a method of upgrading hydrocarbons includes mixing a microwave energy absorbing substance with the hydrocarbons to form a mixture that is conveyed through tubing. The hydrocarbons are produced from a well. Introducing microwaves into the mixture within the tubing along a flow path of the mixture disposed outside the well between a wellhead of the well and a transport outlet to a refinery heats at least part of the mixture to above 250° C. such that at least some molecules of the hydrocarbons are broken into smaller molecules.

According to one embodiment, a method of upgrading hydrocarbons includes recovering the hydrocarbons from a well and dividing flow of the hydrocarbons that are recovered into a first pathway and a second pathway. The method further includes introducing microwaves into the flow along the first and second pathways. The microwaves heat at least some of the hydrocarbons to above 250° C. such that at least some molecules of the hydrocarbons are broken into smaller molecules.

For one embodiment, a production system for upgrading hydrocarbons includes tubing disposable to receive the hydrocarbons recoverable in a well. The tubing defines a first section and a manifold with second and third sections each split independent of one another off of the first section and having a smaller internal cross-sectional area than the first section. In addition, the system includes a microwave generator oriented to introduce microwaves inside the tubing along the second and third sections of the tubing and operable to heat at least some of the hydrocarbons inside the tubing to at least 250° C. for breakage of at least some molecules of the hydrocarbons into smaller molecules.

BRIEF DESCRIPTION OF THE DRAWINGS

The invention, together with further advantages thereof, may best be understood by reference to the following description taken in conjunction with the accompanying drawings.

DETAILED DESCRIPTION OF THE INVENTION

Embodiments of the invention relate to processes and systems that introduce microwaves into mixtures containing hydrocarbons. The microwaves cause heating of the hydrocarbons in order to upgrade the hydrocarbons. Such upgrading occurs after recovering the hydrocarbons from within a formation and results in lowering viscosity of the hydrocarbons to enable transportation of the hydrocarbons to offsite locations, such as a refinery.

Figure 1:
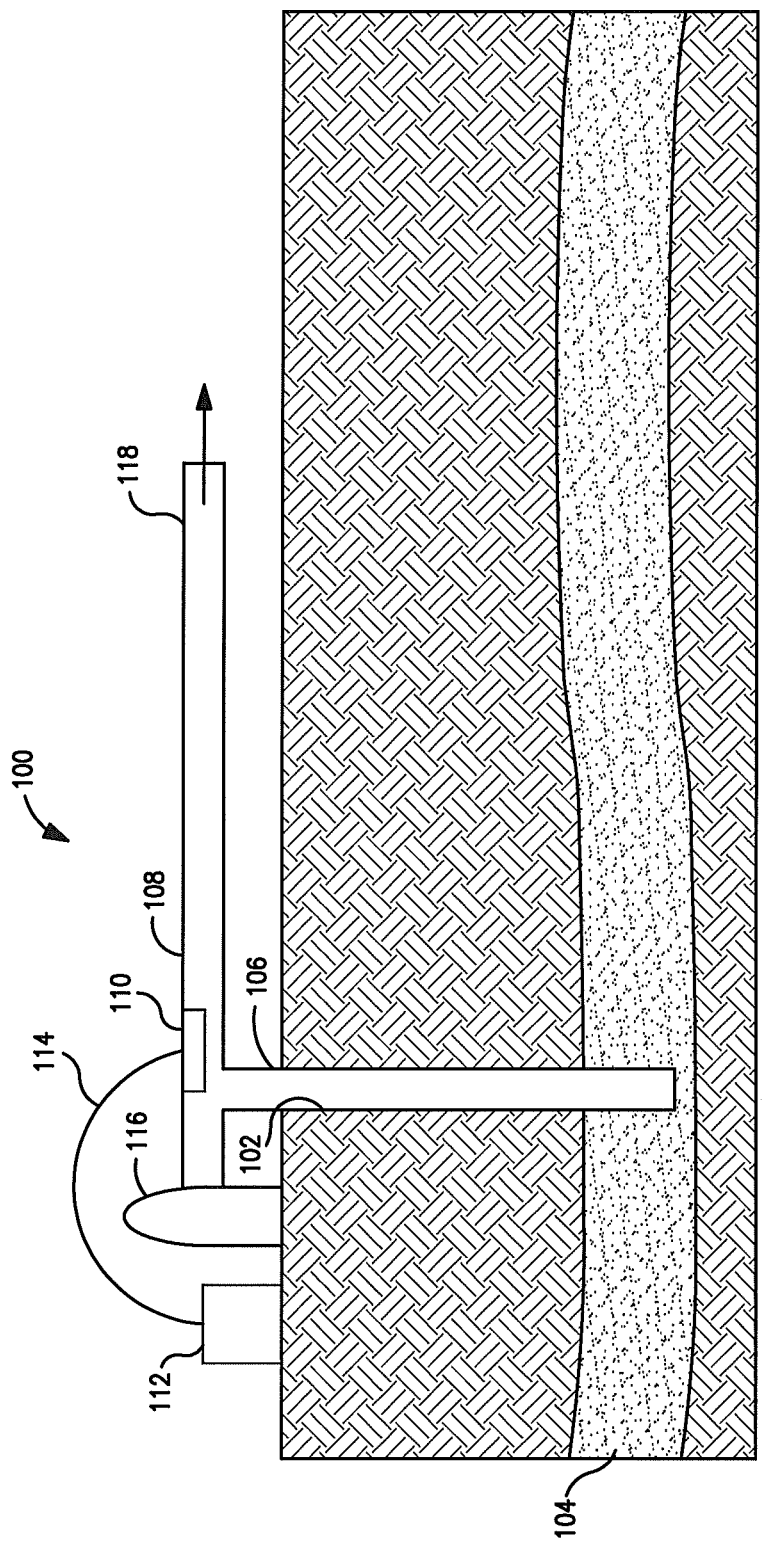
FIG. 1 is a schematic of a production system for introducing a microwave energy absorbing substance to hydrocarbons and heating a resultant mixture with microwaves to upgrade the hydrocarbons prior to transport, according to one embodiment of the invention.

FIG. 1 illustrates a production system 100 for introducing a microwave energy absorbing substance to hydrocarbons and heating a resultant mixture with microwaves to upgrade the hydrocarbons prior to transport. A production well 102 extends into an earth formation and intersects a hydrocarbon bearing reservoir 104. In some embodiments, the hydrocarbons while in the reservoir 104 define heavy oil or bitumen with API gravity less than 25° or less than 10°. At surface, a wellhead 106 couples the well 102 in fluid communication with a conduit or tubing 108 disposed outside of the well 102.

The system 100 includes a microwave generator 110 that in some embodiments is disposed inside of the tubing 108. If the generator 110 is disposed outside of the tubing 108, a portion of the tubing 108 may be made of a material (e.g., ceramic or quartz) transparent to microwaves. A power supply 112 provides energy via line 114 to the microwave generator 110. In operation, the microwave generator 110 introduces microwaves into the tubing 108 in order to heat the hydrocarbons passing through the tubing 108 toward a transport outlet, such as a pipeline 118 used in conveying the hydrocarbons to a refinery.

For some embodiments, the system includes a tank or source 116 of a microwave energy absorbing substance. The source 116 couples in fluid communication with hydrocarbons recovered using the production well 102 to produce a mixture of the hydrocarbons and the substance within the tubing 108 along where the microwave generator 110 is located. Based on more efficient coupling of the substance with the microwaves than the hydrocarbons with the microwaves, the substance facilitates in heating of the mixture.

Examples of the microwave energy absorbing substance include ionic liquids that may include metal ion salts and may be aqueous. Asymmetrical compounds selected for the microwave energy absorbing substance provide more efficient coupling with the microwaves than symmetrical compounds. In some embodiments, ions forming the microwave energy absorbing substance include divalent or trivalent metal cations. Inorganic anions, such as halides of Na, Al, Fe, Ni, and Zn, including $AlCl_4^-$, $FeCl_4^-$, $NiCl_3^-$, $ZnCl_3^-$ and combinations thereof may form the substance. Other suitable compositions for the substance include transitional metal compounds or organometallic complexes.

For some embodiments, the microwave energy absorbing substance includes electric conductors, such as particulate carbon, graphite particles, metal particles, and/or semiconductor materials, for mixing with the hydrocarbons recovered with the production well 102. The microwaves produced by the microwave generator 110 induce electric current in such conductive materials. Size of the conductive materials provides an inherent resistance to flow of electrons and causes resistance heating in the conductive materials. Exemplary carbon material may come from carbon black or fine or be milled from coke or graphite.

Figure 2:
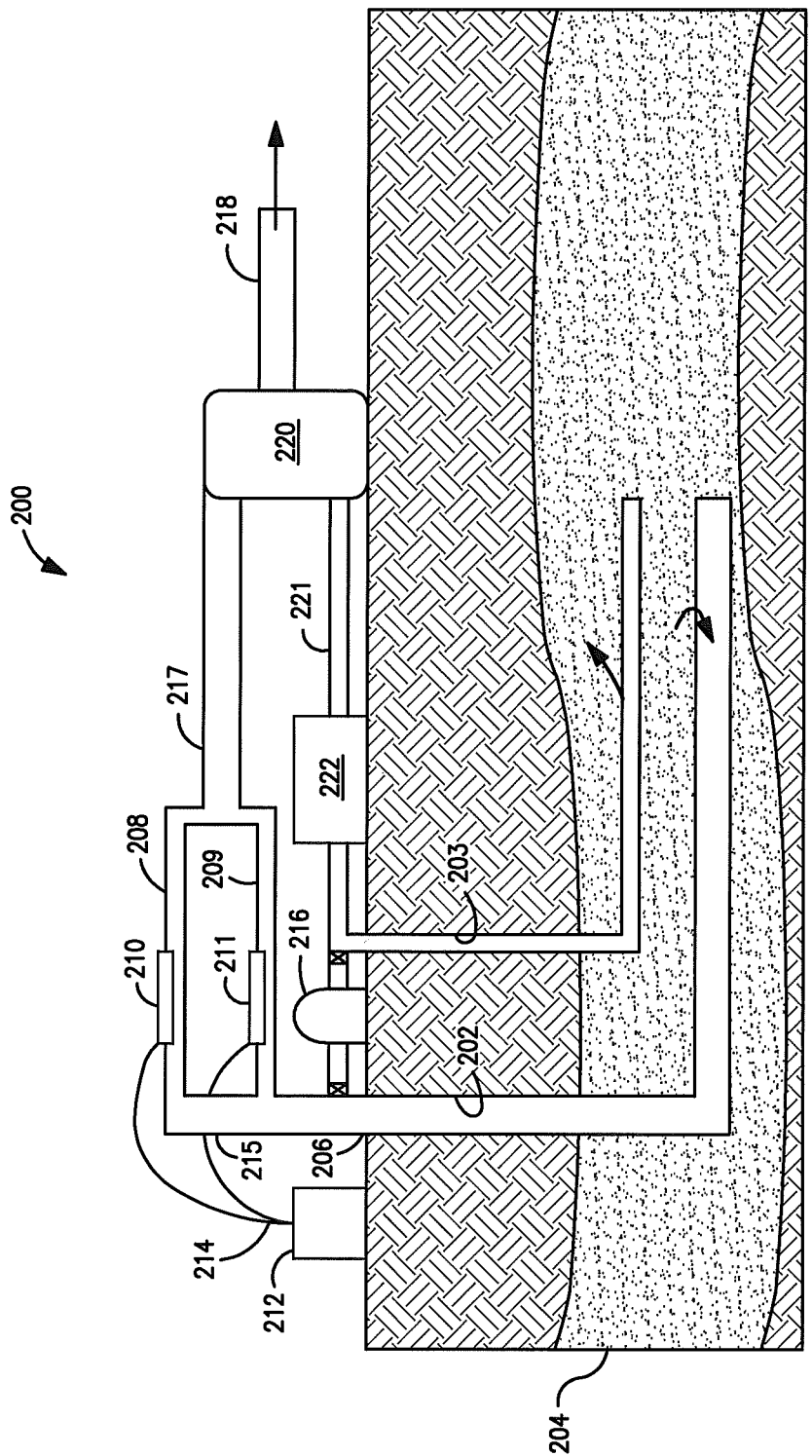
FIG. 2 is a schematic of another production system illustrating exemplary steam assisted gravity drainage to obtain hydrocarbons and introduction of microwaves into divided hydrocarbon flow pathways prior to transport, according to one embodiment of the invention.

As an advantage, the carbon material may travel along with the hydrocarbon into the refinery without any problems since the carbon material is a product of the refinery and not a contaminant that must be removed. Some of the microwave energy absorbing substance may carryover with the hydrocarbons through the pipeline 118 even if the substance is recycled onsite as depicted in FIG. 2. Regardless of whether all the carbon material introduced enters the refinery or just this carryover, the refinery requires no special pre-treatment as a result of the carbon material presence.

The microwaves from the generator 110 heat the mixture within the tubing 108 to above 250° C. such that at least some molecules of the hydrocarbons are broken into smaller molecules. The hydrocarbons at the wellhead 106 have a higher average molecular weight than the hydrocarbons after having passed by the generator 110. This breaking or cracking of the molecules results in a permanent reduction in viscosity of the hydrocarbons and not just a temporary temperature dependent reduction in viscosity. In some embodiments, the heating converts the hydrocarbons to have API gravity greater than 10° or greater than 25°. The resulting viscosity reduction therefore enables the hydrocarbons to flow through the pipeline 118 even where average temperature of the hydrocarbons in the pipeline 118 away from the wellhead 106 may be below 30° C., such as about 15° C. In some embodiments, the hydrocarbons in the tubing 108 at the generator 110 reach temperatures of at least 250° C. or at least 350° C. and below about 450° C. to avoid coking of the hydrocarbons.

The heating of the hydrocarbons within the tubing 108 can obtain such desired temperatures, which may represent an average temperature of all hydrocarbons passing through the tubing 108 for a discrete time interval. Since the hydrocarbons are contained within the tubing 108, the microwaves provide consistent and constant heating to a finite volume of the hydrocarbons. By contrast, in situ heating of hydrocarbons within formations cannot achieve such controlled heating results leaving some hydrocarbons heated less than desired. Further, hydrocarbon temperatures with the in situ applications vary based on proximity to microwave generators since the energy of microwave radiation decreases rapidly with the depth of penetration and the hydrocarbons are within an uncontrolled area.

Location of the generator 110 inside of the tubing 108 may further facilitate in achieving efficiency to obtain the heating of the hydrocarbons to sufficient temperatures for upgrading. By being inside of the tubing 108, the microwaves from the generator 110 first interact with the mixture without having to heat walls of the tubing 108 prior to reaching the hydrocarbons. Placing the generator 110 in direct proximity with the mixture also limits or eliminates loss from waveguides utilized to convey the microwaves to where desired.

Further, utilizing the microwave energy absorbing substance to absorb microwave energy and transfer heat to the hydrocarbons through conduction makes attaining the desired temperatures feasible. In addition to the more efficient coupling of the substance with the microwaves than the hydrocarbons with the microwaves, the substance provides a known particular frequency of maximum microwave absorption and to which the generator 110 may be tuned. Introducing the substance into a confined volume of the tubing 108 ensures the mixture contains a known concentration of the substance and influences distribution of the substance throughout the hydrocarbons prior to heating with the generator 110. Fluid flow mixing devices such as veins or a Venturi disposed in a flow path of the mixture at an upstream location from the generator 110 may enhance distribution of the microwave energy absorbing substance introduced from the source 116. The distribution of the substance in the mixture determines heating ability since heating of the hydrocarbons depends in part on conduction between the hydrocarbons and the substance.

For some embodiments, the generator 110 defines a variable frequency source of a preselected bandwidth sweeping around a central frequency. As opposed to a fixed frequency source, the sweeping by the generator 110 can provide time-averaged uniform heating of the hydrocarbons with proper adjustment of frequency sweep rate and sweep range to encompass absorption frequencies of constituents, such as water and the microwave energy absorbing substance, within the mixture. The generator 110 may produce microwaves that have frequencies ranging from 0.3 gigahertz (GHz) to 100 GHz. For example, the generator 110 may introduce microwaves with power peaks at a first discrete energy band around 2.45 GHz associated with water and a second discrete energy band spaced from the first discrete energy band and associated with carbon particles introduced from the source 116.

Any approach may enable recovery of the hydrocarbons from the reservoir 104 through the production well 102. Various aspects of onsite upgrading of the hydrocarbons as described herein occur independent of recovery and production methods used to obtain the hydrocarbons from the reservoir 104 and take place in proximity to the wellhead 106 relative to the refinery. Some embodiments rely on methods such as primary natural recovery, cyclic steam stimulation, in situ combustion, and steam assisted gravity drainage (SAGD) to establish flow of the hydrocarbons from the reservoir 104 into the production well 102.

FIG. 2 shows a microwave based upgrading system 200 employing an exemplary SAGD method to obtain hydrocarbons from a reservoir 204. The microwave based upgrading system 200 identifies additional alternatives within a particular application and is based on foregoing concepts and details not repeated or shown in all possible permutations for conciseness. In operation, a steam generator 222 supplies steam at a pressure of about 1400 psig, for example, into an injection well 203 to heat the hydrocarbons in the reservoir 204 and enable flow of the hydrocarbons into a production well 202. For some embodiments, the injection well 203 includes a horizontal borehole portion that is disposed above (e.g., 4 to 6 meters above) and parallel to a horizontal borehole portion of the production well 202.

Fluid supplied into the injection well 203 may include the steam alone or in combination with other solvents or injectants, such as microwave energy absorbing substances introduced from a source 216 at surface. The microwave energy absorbing substance may include any one or more aforementioned compositions to facilitate heating of the hydrocarbons. The steam introduced via the injection well 203 eventually condenses to create an oil/water mixture that migrates through the reservoir 204. For some embodiments, introducing microwaves into the reservoir 204 may enhance recovery of the hydrocarbons prior to upgrading utilizing microwaves as described herein to heat the hydrocarbons that are recovered through the production well 202.

The oil/water mixture is gathered at the production well 202 through which the oil/water mixture is recovered to the surface at a wellhead 206 of the production well 202. Tubing extends from the wellhead 206 to a separator 220. The tubing defines a manifold that has a first section 208 and a second section 209 and that couples in fluid communication with the production well 202 via a manifold input 215 defining part of the tubing. The first and second sections 208, 209 split flow of the oil/water mixture into multiple separate paths disposed between the manifold input 215 and a manifold output 217 also defining part of the tubing. Each of the first and second sections 208, 209 contain the mixture within a smaller internal cross-sectional area than the manifold input 215 or the manifold output 217. For example, the first and second sections 208, 209 may each have an internal diameter (e.g., between 7.5 centimeter (cm) and 30.5 cm, between 7.5 centimeter (cm) and 15.5 cm, less than 16 cm or less than 12.0 cm) that is about half as large as provided by each of the manifold input 215 and the manifold output 217.

A first microwave generator 210 and a second microwave generator 211 respectively introduce microwaves into the first section 208 and the second section 209. A power supply 212 provides energy via lines 214 to the first and second microwave generators 210, 211. Passing the microwaves through the mixture results in loss of power as a function of travel length of the microwaves due to the hydrocarbons inhibiting penetration of the microwaves and absorption of the microwaves from other molecules such as water. Breaking the flow of the mixture up into the first and second sections 208, 209 therefore establishes intimate contact between the first and second microwave generators 210, 211 and the mixture flowing through the first and second sections 208, 209. The microwaves thereby maintain penetration throughout the cross-sectional area of the first and second sections 208, 209 for interacting with all of the mixture flowing through the first and second sections 208, 209.

The separator 220 separates the oil/water mixture received from the manifold output 217 and provides both oil product transportable through pipeline 218 and recovered water to a recycle conduit 221. The recycle conduit 221 couples to the steam generator 222 in order to supply the steam generator 222 with the recovered water, which is converted into steam for reinjection into the injection well 203. In some embodiments, the recovered water in the recycle conduit 221 undergoes treating that may remove the microwave energy absorbing substance that may then be recovered and/or regenerated to replenish the source 216. Even if not part of a steam injection process, the separator 220 permits recovery and recycling of the microwave absorbing substance. In embodiments that do not rely on steam injection, the recycle conduit 221 thus replenishes the source 216 without passing through the steam generator 222.

For some embodiments, the steam generator 222 heats the recovered water with microwaves (2.45 GHz). Unlike a conventional boiler that cannot use dirty or salt water without fouling, microwave heating works better in the presence of salts. Separating out the salt from the recovered water that is heated enables the salt to be recycled.

After initial supply of the microwave energy absorbing substance into circulation within the system 200, the substance may circulate in a continuous loop of injection and production without need for resupply from the source 216 except for any additions to compensate for possible losses within the reservoir 204. The source 216 introduces the microwave energy absorbing substance with injection of the steam into the injection well 203 and/or into the oil/water mixture recovered from the production well 202. Introducing the microwave energy absorbing substance with the steam makes the substance available both for performing in situ microwaving of the hydrocarbons within the reservoir 204 and the upgrading with the first and second microwave generators 210, 211.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

The invention claimed is:

1. A method of upgrading hydrocarbons, comprising:
mixing a microwave energy absorbing substance with the hydrocarbons to form a mixture that is conveyed through tubing, wherein the hydrocarbons are produced from a well; and
introducing microwaves into the mixture within the tubing along a flow path of the mixture disposed outside the well between a wellhead of the well and a transport outlet to a refinery, wherein at least part of the mixture is heated by the microwaves to above 250° C. such that at least some molecules of the hydrocarbons are broken into smaller molecules, wherein the tubing defines a first portion and a manifold with second and third portions, which each have a smaller cross-sectional area than the first portion and are where the microwaves are introduced.

2. The method according to claim 1, further comprising dividing the mixture into first and second pathways that provide the flow path, wherein the microwaves are introduced along the first and second pathways.

3. The method according to claim 1, wherein the mixing includes adding the microwave energy absorbing substance to the hydrocarbons after recovering the hydrocarbons from an earth formation.

4. The method according to claim 1, wherein the transport outlet comprises a pipeline to convey the hydrocarbons to the refinery.

5. The method according to claim 1, wherein the substance comprises a metal-containing compound.

6. The method according to claim 1, wherein the substance comprises particulate carbon.

7. The method according to claim 1, wherein the substance comprises graphite.

8. The method according to claim 1, wherein the substance comprises at least one of $AlCl_4^-$, $FeCl_4^-$, $NiCl_3^-$, and $ZnCl_3^-$.

9. The method according to claim 1, wherein the microwaves are generated inside of the tubing.

10. The method according to claim 1, wherein the mixture is heated by the microwaves to between 250° C. and 450° C.

11. The method according to claim 1, wherein the mixture is heated by the microwaves to an average temperature above 250° C. for all of a flow from the well for a discrete time interval.

* * * * *